(12) United States Patent
Agata

(10) Patent No.: US 6,568,386 B2
(45) Date of Patent: May 27, 2003

(54) SOLAR HEAT HARNESSING SYSTEM

(76) Inventor: Takahiro Agata, 11-22, Numacho, Kishiwada-shi, Osaka 596-0053 (JP)

(*) Notice: Subject to any disclaimer, the term of this patent is extended or adjusted under 35 U.S.C. 154(b) by 0 days.

(21) Appl. No.: 09/958,031
(22) PCT Filed: Jan. 31, 2001
(86) PCT No.: PCT/JP01/00682
§ 371 (c)(1), (2), (4) Date: Oct. 3, 2001
(87) PCT Pub. No.: WO01/57453
PCT Pub. Date: Aug. 9, 2001

(65) Prior Publication Data
US 2002/0153004 A1 Oct. 24, 2002

(30) Foreign Application Priority Data
Feb. 4, 2000 (JP) ............................... 2000-67732

(51) Int. Cl.$^7$ ................................................ F24J 2/32
(52) U.S. Cl. ........................ 126/634; 126/637; 126/641
(58) Field of Search ............................... 126/637, 640, 126/400, 634, 642, 645, 677, 628, 641; 165/104.11

(56) References Cited

U.S. PATENT DOCUMENTS

| 4,099,557 | A | * | 7/1978 | Bricard et al. | 126/400 |
|---|---|---|---|---|---|
| 4,263,895 | A | * | 4/1981 | Colao | 126/586 |
| 4,273,102 | A | * | 6/1981 | Anthony | 126/585 |
| 4,398,529 | A | * | 8/1983 | Schoenfelder | 126/400 |
| 4,557,251 | A | * | 12/1985 | Burkhardt | 126/569 |
| 4,566,430 | A | * | 1/1986 | Vandeplas et al. | 126/592 |
| 4,703,749 | A | * | 11/1987 | Morse | 126/400 |
| 5,245,984 | A | * | 9/1993 | Longmore et al. | 126/609 |
| 5,653,222 | A | * | 8/1997 | Newman | 126/653 |
| 5,806,317 | A | * | 9/1998 | Kohler et al. | 60/641.8 |
| 6,119,683 | A | * | 9/2000 | Nakauchi | 126/634 |
| 6,141,949 | A | * | 11/2000 | Steinmann | 60/39.182 |
| 6,372,978 | B1 | * | 4/2002 | Cifaldi | 126/629 |

FOREIGN PATENT DOCUMENTS

| JP | 56034060 A | * | 4/1981 | ............. F24J/3/02 |
|---|---|---|---|---|
| JP | 56-137034 | | 10/1981 | |
| JP | 60-159377 | | 8/1985 | |

* cited by examiner

Primary Examiner—Henry Bennett
(74) Attorney, Agent, or Firm—Wenderoth, Lind & Ponack, L.L.P.

(57) ABSTRACT

The present invention was achieved in order to provide a solar thermal system, wherein using a small amount of water as a medium, solar thermal energy can be largely and efficiently collected as latent heat of saturated steam or superheated steam with 1 atmospheric pressure, and the generated saturated or superheated steam is automatically transported to be stored with ease and certainty, so that the light weight and downsizing of the apparatus are achieved, and that the apparatus can be easily designed, produced and maintained, resulting in a substantial reduction in cost, which comprises a steam generating chamber to evaporate droplets by solar heat therein, being formed between an absorbing body and a heat insulation case, and a droplet supply means to supply droplets into the steam generating chamber, wherein steam generated in the steam generating chamber is used as a heating medium.

11 Claims, 6 Drawing Sheets

SOLAR HEAT HARNESSING SYSTEM

This is a 371 of PCT/JP01/00682 filed Jan. 31, 2001.

TECHNICAL FIELD

The present invention relates to a solar thermal system and, more particularly, to a solar thermal system wherein solar heat is utilized in a state of saturated steam or superheated steam with a pressure close to 1 atmospheric pressure.

BACKGROUND ART

FIG. 5 is a perspective view partly in section schematically showing the principal part of a conventional solar thermal system, and in the figure, reference numeral 51 represents an absorbing plate. The absorbing plate 51 is made of a stainless steel plate, an aluminum plate, or the like, almost in the shape of a rectangle in a plan view. A black coating (not shown) is applied to the top 51a of the absorbing plate 51, whereby solar heat can be easily absorbed. Multiple flow tubes 52, made of a metal such as copper or stainless steel almost in the shape of a tube, are arranged in parallel at prescribed places on the absorbing plate 51, and the tube walls of the flow tubes 52 and the absorbing plate 51 are united in a body by welding or the like. Headers 53 and 54 almost in the shape of a hollow quadrangular prism are integrally joined to both ends of the flow tubes 52 at the side walls 53a and 54a, and hole portions of the flow tubes 52 communicate with hollow portions of the headers 53 and 54 (neither shown). A case 55 almost in the shape of a box shown by a chain line is arranged around the absorbing plate 51, the flow tubes 52, and the headers 53 and 54, and the space between the inner walls of the case 55, and the absorbing plate 51 and the headers 53 and 54 is filled with an insulation (not shown) such as glass wool. A transmission body 56 is arranged above the absorbing plate 51 and the flow tubes 52 so as to cover them, and the transmission body 56 is made of reinforced glass, a transparent plastic material, or the like which easily transmits solar light almost in the shape of a board. The transmission body 56 is closely fitted to the upper portion of the case 55 through packing (not shown), and the distance D between the transmission body 56 and the absorbing plate 51 or the flow tubes 52 is set as short as possible in order to prevent a heat loss caused by convection. A flat-plate solar thermal collector 50 comprises these absorbing plate 51, flow tubes 52, headers 53 and 54, case 55, transmission body 56, and associated parts.

One end portion 54b of the header 54 is connected through a supply pipe 57a, a pump 57c, a selector valve 57d, and a feed water pipe 57e, to a feed water tank (not shown). In addition, to the selector valve 57d, one end of a supply pipe 57b is connected, while the other end thereof is connected to the lower portion inside a vessel 61. A medium supply system 57 comprises these supply pipes 57a and 57b, pump 57c, selector valve 57d, feed water pipe 57e, and associated parts.

The vessel 61 made of a metal almost in the shape of a hollow rectangular parallelepiped is arranged at a prescribed place below the flat-plate solar thermal collector 50, an insulating member 62 is fitted around the vessel 61, and the outer surface of the insulating member 62 is protected by a protective member 63 made of a metal plate. An air vent portion 61a is formed at a prescribed place in the upper portion of the vessel 61, so that air in the vessel 61 can easily flow out or in through the air vent portion 61a with changes in volume of high temperature water 65 within the vessel 61. One end of a discharge pipe 64a is connected to a prescribed place in the upper portion of the vessel 61, while the other end thereof is connected through a valve 64b to one end portion 53b of the header 53. A heat storage means 60 comprises these vessel 61, insulating member 62, protective member 63, piping 64a, valve 64b, and associated parts.

One end of a piping 66 is fitted to a prescribed place inside the vessel 61, while the other end thereof is connected through a pump to heat-using equipment (neither shown) such as a heat exchanger, a heat pump, a feed water heater, a bathtub, a heating apparatus, and an absorption refrigerating machine. A solar thermal system comprises these flat-plate solar thermal collector 50, medium supply system 57, heat storage means 60, heat-using equipment, and associated parts.

In the use of the solar thermal system with the above construction, the flat-plate solar thermal collector 50 is set and fixed in a prescribed direction and at a prescribed tilt angle so that the absorbing plate 51 should be densely irradiated with solar radiation, and that the header 53 should be in a higher position than the header 54. The valve 64b is opened, the selector valve 57d is switched to the feed water pipe 57e side, and by driving the pump 57c, water is supplied at a prescribed flow rate through the piping 57e, the selector valve 57d, the pump 57c, the piping 57a, and the header 54 to the flow tubes 52 as shown by arrows in the figure. Then, solar heat absorbed by the absorbing plate 51 is transferred through the flow tubes 52 to the water by thermal conduction or the like, so that the high temperature water 65 with almost 1 atmospheric pressure and a temperature of 80–90° C. or so is generated. The high temperature water 65 passes through the header 53, the discharge pipe 64a, and the valve 64b so as to be stored in the heat storage means 60. When the temperature of the high temperature water 65 stored in the heat storage means 60 becomes low, the selector valve 57d is switched to the supply pipe 57b side, and by allowing the water to flow through the flat-plate solar thermal collector 50 again, the temperature of the high temperature water 65 is maintained.

When a prescribed amount of the high temperature water 65 is stored in the heat storage means 60, by driving the pump of the piping 66, the high temperature water 65 is supplied to the heat-using equipment side.

FIG. 6 is a sectional view schematically showing another conventional solar thermal system, and in the figure, reference numerals 51, 52, 53–54, and 55 represent an absorbing plate, flow tubes, headers, and a case, respectively, almost the same as those shown in FIG. 5. To the tops of the absorbing plate 51, the flow tubes 52, and the headers 53 and 54, almost the same black coating (not shown) as shown in FIG. 5 is applied. The space between the inner walls of the case 55, and the absorbing plate 51 and the headers 53 and 54 is filled with an insulation 71. Transmission bodies 72a and 72b are fitted double above the absorbing plate 51 and the flow tubes 52, whereby a heat loss outward caused by conduction is restricted. Furthermore, in order to prevent a heat loss caused by convection, a clearance 72c between the transmission bodies 72a and 72b, and a gap 73 between the transmission body 72a and the absorbing plate 51 are kept at a prescribed low pressure. A flat-plate solar thermal collector 70 comprises these absorbing plate 51, flow tubes 52, headers 53 and 54, case 55, insulation 71, and associated parts.

A heat exchanger 74 is placed below the flat-plate solar thermal collector 70, and the heat exchanger 74 comprises a vessel 74a around which an insulating member (not shown) is fitted, and a coil-like inner piping 74b vertically running within the vessel 74a. The header 53 is connected through a piping 76a to the upper end of the inner piping 74b, while the header 54 is connected through a piping 76b, a compressor 75, and a piping 76c to the lower end of the inner piping 74b. On the other hand, the upper portion of the heat exchanger 74 is connected through a piping 79a to an inlet portion 77a of a steam turbine 77, being a piece of heat-using equipment. And an outlet portion 77b of the steam turbine 77 is connected through a piping 79b, a condenser 78a, a piping 79c, a circulating pump 78b, and a piping 79d, to the lower portion of the heat exchanger 74. In addition, a generator 77d is mechanically coupled to the axis of rotation 77c of the steam turbine 77.

In the use of the solar thermal system with the above construction, by driving the compressor 75 using water, for example, as a heating medium, pressurized water with a prescribed pressure and a prescribed flow rate is supplied through the piping 76c and the header 54 to the flow tubes 52 as shown by an arrow in the figure. Since the solar thermal collector 70 has a smaller heat loss caused by conduction and convection, compared with the solar thermal collector 50 shown in FIG. 5, the temperature of the pressurized water passing through the flow tubes 52 is raised to about 130° C. The pressurized high temperature water passes through the header 53 and the piping 76a to be supplied to the inner piping 74b of the heat exchanger 74. After the temperature thereof is lowered by transfer of heat to water within the vessel 74a, the pressurized water passes through the piping 76b and the compressor 75 to be circulated again. On the other hand, the water heated in the heat exchanger 74 becomes pressure steam, which is introduced through the piping 79a to the steam turbine 77 and expands therein. The steam comes into collision with turbine blades (not shown) with developing the velocity of flow and drives the generator 77d through the axis of rotation 77c so as to generate electricity. The steam discharged from the steam turbine 77 becomes hot water in the condenser 78a, which is supplied through the circulating pump 78b to the heat exchanger 74 to be circulated again.

As described above, in the solar thermal system shown in FIG. 5, solar thermal energy is transformed to be collected as sensible heat of the high temperature water 65 (with about 1 atmospheric pressure and a temperature of 80–90° C. or so). In this case, the amount of heat collected per unit weight of water is smaller than that in the case of latent heat collection. As a result, in order to collect large amounts of heat, it is necessary to supply and transport relatively large amounts of water to the solar thermal collector 50. Therefore, the rigidity of the apparatus and the device capacities of the pump 57c and the like must be set high, so that the apparatus is difficult to design and the cost thereof tends to be high. In addition, since the heat loss from the transmission body 56 and the like is large, the heat-collection efficiency is not good.

Though it is not shown in the figure, in a large-scale solar thermal system wherein multiple solar thermal collectors 50 are coupled and placed at the ground level and the top of the heat storage means 60 is set higher than the tops of the solar thermal collectors 50, another pump for controlling the flow rate, being interlocked with the pump 57c, needs to be placed near the valve 64b in order to store the high temperature water 65 in the heat storage means 60. As a result, the system is difficult to design, assemble, and maintain, and the cost thereof tends to be further higher.

As described above, in the solar thermal system shown in FIG. 6, solar thermal energy is transformed to be collected as sensible heat of pressurized high temperature water (with about 4–6 atmospheric pressure and a temperature of 110–130° C. or so). The amount of heat collected per unit weight of water is smaller, similarly to the case in FIG. 5. As a result, it is necessary to supply and transport relatively large amounts of water to the solar thermal collector 70. Therefore, the rigidity of the whole apparatus and the device capacities of the compressor 75 and the like need to be set high. In addition, since the solar thermal collector 70, the heat exchanger 74, the compressor 75, and the like constitute a closed cycle and the pressure of water is high, it is necessary to make the pressure resistance much higher, compared with that in FIG. 5, and to prevent leakage of water. Moreover, since the clearance 72c and the gap 73 must be kept almost in vacuum, it tends to be difficult to design, produce and maintain the solar thermal collector 70. As a result, the cost is likely to be much higher.

DISCLOSURE OF INVENTION

The present invention was developed in order to solve the above problems, and it is an object of the present invention to provide a solar thermal system, wherein using a small amount of water as a medium, solar thermal energy can be largely and efficiently transformed to be collected as latent heat of saturated steam or superheated steam with 1 atmospheric pressure, and the generated saturated steam or super-heated steam is automatically transported and can be easily and certainly stored, so that the light weight of apparatus and the downsizing of device capacities can be achieved, and that the apparatus can be easily designed, produced and maintained, resulting in a substantial reduction in cost.

The present inventors completed the present invention on the basis of the following knowledge shown in (1)–(6).

(1) When the collectable amount of heat of solar energy by a flat-plate solar thermal collector is about 500 W/m$^2$, the theoretical amount of saturated water (with a rise in temperature from 0° C. to 100° C. and 1 atmospheric pressure) generated by that amount of heat is about 1.2 g/m$^2$·s (about 12 g/m$^2$·s in the case of a rise in temperature from 90° C. to 100° C.). On the other hand, the theoretical amount of saturated steam (with a temperature of 100° C. and 1 atmospheric pressure) generated by that amount of heat is about 0.22 g/m$^2$·s (about 370 ml/m$^2$·s). Compared with the case of generating saturated water with a rise in temperature from 0° C. to 100° C., the weight of water used (circulating) can be reduced to about ⅕ (about ⅟₅₀ in the case of a rise in temperature from 90° C. to 100° C.).

Therefore, when solar thermal energy is collected as latent heat of saturated steam, for example, the amount of a medium (water) supplied can be made smaller, so that it is possible to reduce the strength of apparatus and the capacities of devices, leading to cost cutting.

(2) A droplet having a radius of 10$^{-4}$ m–10$^{-5}$ m more easily absorbs radiant heat, compared with bulk water with a smooth surface. In addition, when the radius of the droplet becomes about 10$^{-7}$ m or smaller with vaporization, the saturated steam pressure becomes larger, compared with the bulk water, so that under 1 atmospheric pressure, the droplet is likely to change into steam at lower temperatures than 100° C.

(3) When the top of saturated water and the bottom of a high temperature absorbing body face each other with steam between, the thermal radiant energy applied to the top of the saturated water is expressed by the following equation (a), where $E_w$ is the thermal radiant energy of the saturated water, the thermal emissivity $\epsilon_w$ of the top of the saturated water (regarded as a black body) is 1, $\epsilon_c$ is the thermal emissivity of the bottom of the absorbing body, and $E_{cb}$ is the thermal radiant energy of the black body at the same temperature as the temperature $T_c$ of the absorbing body.

$$(1-\epsilon_c)E_w + \epsilon_c \times E_{cb} \qquad (a)$$

Therefore, the energy E which is transformed to latent heat by water vaporization is expressed by the following equation (b).

$$E=\{(1-\epsilon_c)E_w \epsilon_c \times E_{cb}\} - E_w = \epsilon_c(E_{cb}-E_w) \qquad (b)$$

At this time, since the thermal radiant energy $E_w$ of the saturated water is constant, E is roughly proportional to $\epsilon_c$. By making the bottom of the absorbing body a black body, it is possible to increase the amount of radiative transfer from the absorbing body to the saturated water. On the other hand, when the bottom of the absorbing body is not made a black body, the amount of radiative transfer to the saturated water greatly decreases and only the temperature of the absorbing body rises.

(4) When an absorbing body having a prescribed temperature is arranged in a horizontal position in the upper portion inside a steam generating chamber full of droplets, superheated steam with relatively high temperatures, saturated steam with about 100° C., and saturated water with temperatures of about 100° C. and less are distributed and dwell in this order in the downward direction from the vicinity of the bottom of the absorbing body. Since the droplets distributed in the higher positions have smaller specific gravities, natural convection is unlikely to occur. In addition, in the generation of saturated steam and superheated steam, forced convection based on changes in volume has a minimal chance of occurrence. The existence of such dwelling and distribution lowers the heat transfer efficiency from the absorbing body to the droplets.

(5) When the flow of steam in a transport system is a steady flow, the pressure difference ΔP between the pressure within the steam generating chamber and 1 atmospheric pressure is expressed by the following equation (c), where $\Delta P_u$ is the minimum steam pressure difference required for making the steady flow, and $\Delta P_1$ is a pressure loss (transport resistance) in the transport system.

$$\Delta P = \Delta P_u + \Delta P_1 \qquad (c)$$

Therefore, when the transport system is fully thermally insulated by an insulation, by controlling the pressure difference ΔP between the pressure within the steam generating chamber and 1 atmospheric pressure to be about a few hundred Pa, the density of steam can be almost uniform in the whole passage of the transport system. As a result, as steam is continuously generated in the steam generating chamber, almost the same amount of steam as that can be automatically pushed out and transported in sequence through the transport system. In addition, in order to make the pressure loss $\Delta P_1$ of the transport system almost a few hundred Pa or less, the sectional form of the piping in the transport system is easily determined based on the steam transport capacity, the transport distance, and the like. As a result, the transport system can be easily designed and the resistance to pressure of the whole system can be set low.

(6) In the case of a steam storage means in the shape of a cup upside down, when saturated steam, for example, is supplied thereto, the saturated steam moves upward and is stored in the upper portion (steam storage portion) inside the steam storage means, since the specific gravity of the saturated steam is smaller than that of air, while air moves downward. Since the air is pushed up at all times with 1 atmospheric pressure through an opening, the saturated steam with 1 atmospheric pressure can be certainly stored in the steam storage portion.

In order to achieve the above object, a solar thermal system (1) according to the present invention is characterized by comprising a steam generating chamber formed between an absorbing body and a heat insulation case, wherein droplets are evaporated by solar heat, and a droplet supply means to supply droplets into the steam generating chamber, wherein steam generated in the steam generating chamber is used as a heating medium.

Here, the droplet to be supplied into the steam generating chamber by the droplet supply means is roughly spherical in shape and the radius thereof is desirably $10^{-4}$–$10^{-5}$ m or so from the viewpoint of the power efficiency in the droplet supply means.

Using the above solar thermal system (1), since the droplets supplied by the droplet supply means fill the steam generating chamber, and the droplets more easily absorb radiant heat energy emitted by the absorbing body, compared with running water or the like, the droplets easily and certainly evaporate. Therefore, solar thermal energy can be efficiently transformed to be collected as steam latent heat having a large heat capacity, and the required amount of a medium (the amount of water used) to the amount of heat collected can be greatly reduced. As a result, the light weight and downsizing of the apparatus can be achieved, leading to cost cutting. In addition, since the constructions of the medium supply system and the heat transport system become simple, the system can be easily adapted to a large-scale system for acquiring a large amount of energy, and it can be easily produced and maintained A solar thermal system, (2) according to the present invention is characterized by comprising a solar thermal collector which comprises an absorbing body, made of a metal plate having one main surface on which a selective absorption film with a large absorptance of solar light and a small emissivity of infrared rays is formed, and the other main surface which is made a black body, a heat insulation case almost in the shape of a box to which the absorbing body is fitted with the other main surface side thereof down, a steam generating chamber formed between the heat insulation case and the absorbing body, a droplet supply means to supply droplets into the steam generating chamber, and a transport system whereby steam generated in the steam generating chamber is transported outside the system, wherein the transport resistance of the transport system is set so that the steam pressure within the steam generating chamber can be kept almost 1 atmospheric pressure.

The difference of the steam pressure within the steam generating chamber from 1 atmospheric pressure changes depending on the thermal insulation performance of the heat insulating material, the cross section and distance of the steam passage, the speed of flow of steam, and the like, but it is desirably plus a few hundred Pa or less, if there is.

Using the above solar thermal system (2), almost the same effects as those in the solar thermal system (1) can be obtained, and solar thermal energy can be efficiently absorbed by the absorbing body with the selective absorption film formed on the one main surface thereof, while the heat transfer of the solar thermal energy absorbed by the absorbing body to the droplets can be certainly conducted because of the treatment of making the other main surface a black body. As a result, the solar thermal energy can be more efficiently collected. In addition, the transport resistance of the transport system is set so that the steam pressure within the steam generating chamber can be kept almost 1 atmospheric pressure. Therefore, as steam is generated within the steam generating chamber, almost the same amount of steam as that can be automatically pushed out and transported in sequence through the transport system by making one side of the transport system open to the atmosphere. Since the sectional form of the transport system can be easily determined based on the steam transport capacity, transport distance, and the like so that the steam pressure within the steam generating chamber can be kept almost 1 atmospheric pressure, the transport system can be easily designed, and the resistance to pressure can be wholly held down, resulting in a large reduction in cost.

A solar thermal system (3) according to the present invention is characterized by comprising: a solar thermal collector which comprises an absorbing body, made of a metal plate having one main surface on which a selective absorption film with a large absorptance of solar light and a small emissivity of infrared rays is formed, and the other main surface which is made a black body, a heat insulation case almost in the shape of a box to which the absorbing body is fitted with the other main surface side thereof down, a steam generating chamber formed between the heat insulation case and the absorbing body, a droplet supply means to supply droplets into the steam generating chamber, and a transport system whereby steam generated in the steam generating chamber is transported outside the system, wherein the transport resistance of the transport system is set so that the steam pressure within the steam generating chamber can be kept almost 1 atmospheric pressure; a steam storage means, being connected through the transport system of the solar thermal collector, with an opening open to the atmosphere in the lower portion thereof and a steam storage portion in the upper portion thereof; a heat-using means such as a heat exchanger and/or a power-using means such as a steam turbine, being connected through a steam piping to the steam storage means; and a discharge means to discharge a gas such as steam introduced to the heat-using means and the steam piping.

Using the above solar thermal system (3), almost the same effects as those in the solar thermal system (2) can be obtained, and the steam storage means with a given-shaped opening is connected through the transport system. Therefore, as steam is continuously generated in the steam generating chamber, almost the same amount of steam as that is automatically pushed out of the transport system in sequence and is transported to the steam storage means. In addition, since the specific gravity of steam is smaller than that of the atmosphere and the atmosphere is pushed up at all times with 1 atmospheric pressure through the opening, the transported steam with 1 atmospheric pressure can be certainly stored within the steam storage means. Since a heat-using means and/or a power-using means are connected through the steam piping to the steam storage means, and a discharge means to discharge a gas such as steam introduced to the heat-using means and the steam piping is equipped, the atmosphere dwelling within the heat-using means and the steam piping at the start of the operation can be discharged, or an incondensable gas generated within the beat-using means during operation can be discharged. As a result, the steam within the steam storage means can be certainly transported and introduced to the heat-using means and/or the power-using means to be utilized.

A solar thermal system (4) according to the present invention is characterized by comprising: a solar thermal collector which comprises an absorbing body, made of a metal plate having one main surface on which a selective absorption film with a large absorptance of solar light and a small emissivity of infrared rays is formed, and the other main surface which is made a black body, a heat insulation case almost in the shape of a box to which the absorbing body is fitted with the other main surface side thereof down, a steam generating chamber formed between the heat insulation case and the absorbing body, a droplet supply means to supply droplets into the steam generating chamber, and a transport system whereby steam generated in the steam generating chamber is transported outside the system, wherein the transport resistance of the transport system is set so that the steam pressure within the steam generating chamber can be kept almost 1 atmospheric pressure; a steam storage means, being connected through the transport system of the solar thermal collector, with an opening open to the atmosphere in the lower portion thereof and a steam storage portion in the upper portion thereof; a heat-using means such as a heat exchanger and/or a power-using means such as a steam turbine, being connected through a steam piping to the steam storage means; a discharge means to discharge a gas such as steam introduced to the heat-using means and the steam piping; and an outside-air intake regulator.

Using the above solar thermal system (4), almost the same effects as those in the solar thermal system (3) can be obtained, and since the outside-air intake regulator is equipped, the amount of steam supplied can be regulated or a prescribed amount of outside air can be introduced, so that the movements of the heat-using means and the power-using means can be controlled and the movement of the heat-using means can be certainly stopped.

A solar thermal system (5) according to the present invention is characterized by the outside-air intake regulator, which is controlled using a controller, based on data from a detecting means to detect the amount of steam generated and the amount of steam stored in the steam storage means in the solar thermal system (4).

Using the above solar thermal system (5), when multiple heat-using means and/or power-using means are connected to the steam storage means, prescribed amounts of flow of steam can be certainly distributed and supplied to prescribed heat-using means and/or power-using means to drive, in accordance with variations in the amounts of steam generated and stored.

A solar thermal system (6) according to the present invention is characterized by a mixing means to mix steam in the steam generating chamber in any of the solar thermal systems (1)–(5).

Using the above solar thermal system (6), droplets and steam which are distributed and dwell so that the temperatures thereof become higher in an upward direction from the bottom within the steam generating chamber can be wholly stirred up and mixed. As a result, the heat transfer efficiency from the absorbing body to the droplets can be heightened, so that steam can be efficiently generated.

A solar thermal system (7) according to the present invention is characterized by the droplet supply means, which also serves as a mixing means in any of the solar thermal systems (1)–(5).

Using the above solar thermal system (7), the mixing means can be arranged at the same place as the droplet supply means, and droplets can be mixed at the same time as they are generated. As a result, the heat transfer efficiency can be further higher.

A solar thermal system (8) according to the present invention is characterized by comprising a transmission body which transmits light arranged above the absorbing body so as to cover the absorbing body in any of the solar thermal systems (1)–(7).

Using the above solar thermal system (8), by setting the distance between the transmission body and the absorbing body to be short, a heat transfer loss outward based on the occurrence of convection can be prevented, and a selective absorption film formed on the top of the absorbing body can be protected mechanically and chemically.

BEST MODE FOR CARRYING OUT THE INVENTION

Figure 1:
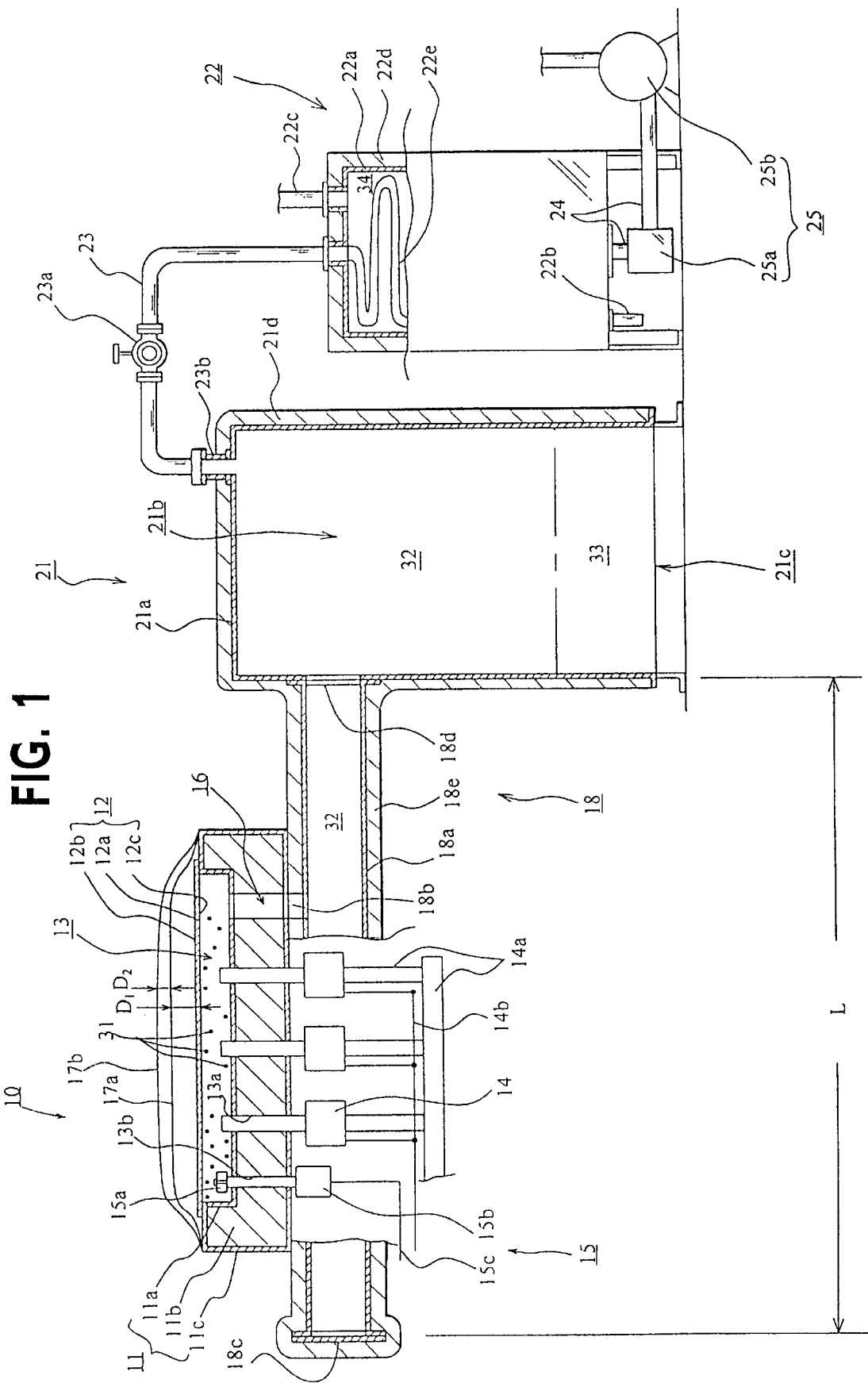
FIG. 1 is a sectional view schematically showing a first embodiment of a solar thermal system according to the present invention.
Figure 2:
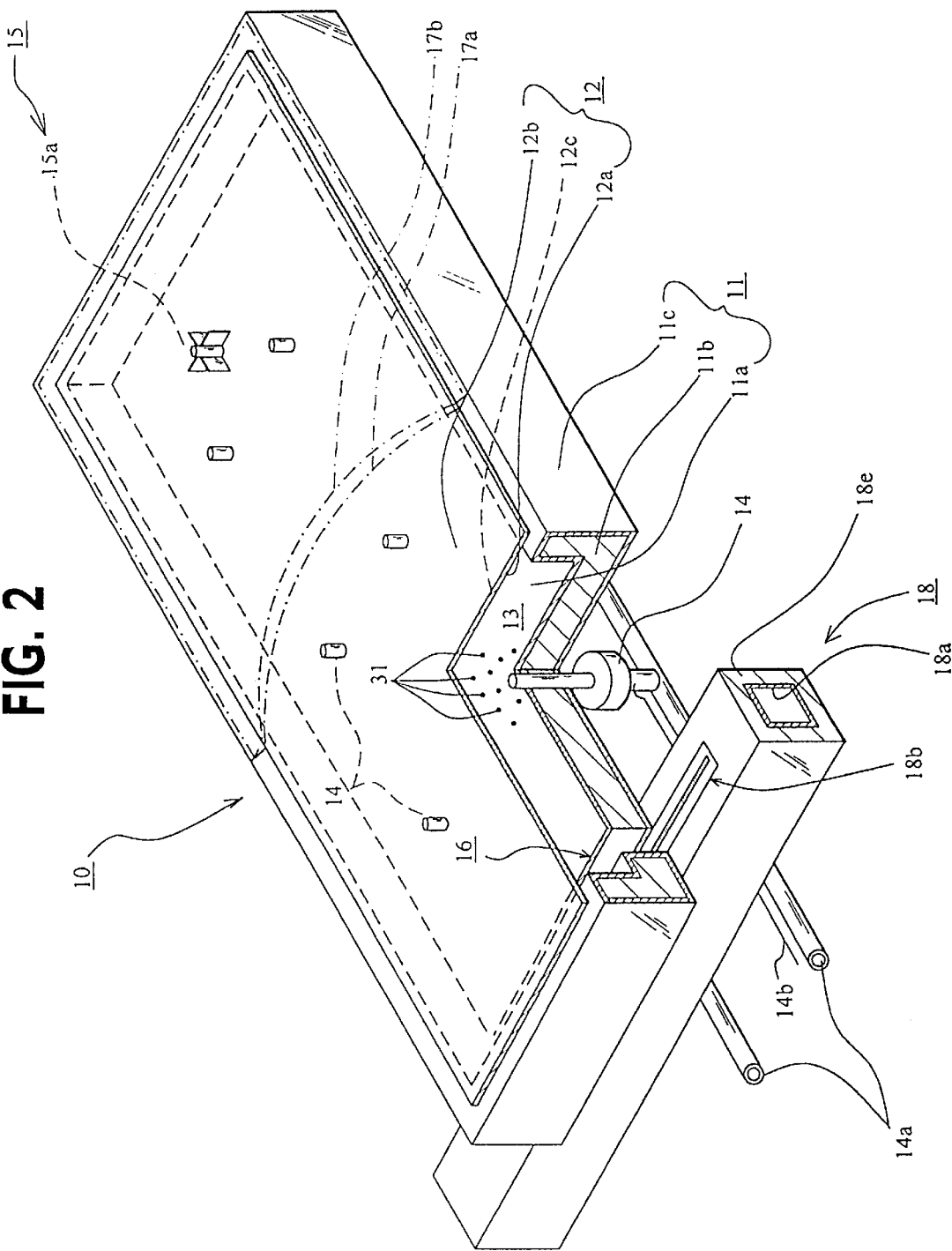
FIG. 2 is a perspective view partly in section showing in detail a solar thermal collector and its vicinity in the solar thermal system according to the first embodiment.

The preferred embodiments of the solar thermal system according to the present invention are described below by reference to the Figures of the drawings. Here, the same marks are affixed to components having the same functions as those in the conventional examples FIG. 1 is a sectional view schematically showing a solar thermal system according to a first embodiment, and FIG. 2 is a perspective view partly in section showing in detail a solar thermal collector and its vicinity in the solar thermal system according to the first embodiment. A frame 11a is made of a relatively thin plate of stainless steel, a plastic material, or the like, almost in the shape of a box. An insulating member 11b is arranged around the frame 11a, and the insulating member 11b is protected by a protective member 11c. A heat insulation case 11 comprises these frame 11a, insulating member 11b, protective member 11c, and associated parts.

In the upper portion of the heat insulation case 11, a metal plate 12a made of a stainless steel plate or the like almost in the shape of a rectangle in a plan view is closely fitted. On the top of the metal plate 12a, a selective absorption film 12b is formed using a technique such as a chemical conversion treatment, and the selective absorption film 12b absorbs thermal energy the sun emits (wavelengths of about 3 μm and less), while it is unlikely to emit thermal energy in the infrared region (wavelengths of about 3 μm and more) in an absorbing body 12. On the other hand, on the bottom of the metal plate 12a, a black body film 12c is formed using a technique such as applying a silicone resin, and with the black body film 12c, the amount of radiative heat transfer from the absorbing body 12 to droplets 31 is secured. The absorbing body 12 comprises these metal plate 12a, selective absorption film 12b, black body film 12c, and associated parts.

Two transmission bodies 17a and 17b are fitted to the upper portion of the absorbing body 12 so that the absorbing body 12 is covered thereby. The transmission bodies 17a and 17b are made of transparent fluorocarbon resin (FEP) films, which can transmit solar light sufficiently. In addition, the distance between the absorbing body 12 and the transmission body 17a, and the distance between the transmission bodies 17a and 17b are set to be $D_1$ and $D_2$, respectively, and with the spaces $D_1$ and $D_2$, a heat loss based on the convection of air can be held down. The distances $D_1$ and $D_2$ are desirably between 40 mm and 80 mm.

A steam generating chamber 13 comprises a space having a prescribed volume surrounded by the absorbing body 12 and the heat insulation case 11. The steam pressure within the steam generating chamber 13 varies depending on the temperature of steam, the amount of steam generated, the pressure resistance of a transport system 18 connected to an outlet 16, and the like, but it is set to be a few hundred Pa less than 1 atmospheric pressure. Multiple hole portions 13a are formed at prescribed places on the heat insulation case 11, and into each of the hole portions 13a, a front portion of a droplet supply means 14 comprising an ultrasonic atomizer, for example, is inserted and fitted so that the front portion thereof is situated inside the steam generating chamber 13. To each droplet supply means 14, a feed water piping 14a and a current-carrying line 14b are connected, respectively. By regulating the amount of water supplied to the droplet supply means 14, the amount of power supplied to a transducer in the droplet supply means 14, and the like, the short-term changes in amount of sunshine and the load change of a heat-using means can be dealt with. In addition, a hole portion 13b is formed at another prescribed place on the insulation case 11, and a connecting portion of a mixing means 15, comprising a moving blade portion 15a, a motor 15b, and associated parts, is inserted in the hole portion 13b. A current-carrying line 15c is connected to the mixing means 15c.

An almost groove-shaped outlet 16 having a prescribed cross section is formed at a prescribed place on the insulation case 11, and a piping main 18a having a prescribed length of L is arranged below and along the outlet 16. An opening 18b is formed at a prescribed place on the piping main 18a, and the opening 18b and the outlet 16 are connected to each other. One end of the piping main 18a is blocked by a blank flange 18c, for example, while to the other end thereof, a connecting flange 18d, for example, is fitted. An insulating member 18e is wrapped around the piping main 18a and the flanges 18c and 18d. The transport system 18 comprises these outlet 16, piping main 18a, opening 18b, flanges 18c and 18d, and associated parts.

A solar thermal collector 10 comprises these insulation case 11, absorbing body 12, steam generating chamber 13, droplet supply means 14, transport system 18, and associated parts. Here, it is desirable that the solar thermal collector 10 should be placed almost horizontally, but it is also possible to place the solar thermal collector 10 in a tilted position.

The solar thermal collector 10 is connected through the connecting flange 18d of the transport system 18 to the upper portion of the side wall of a vessel 21a almost in the shape of a cup upside down. The upper portion of the vessel 21a is a steam storage portion 21b, while an opening 21c is formed in the lower portion of the vessel 21a. Through the opening 21c, the steam storage portion 21b is kept open at all times to the atmosphere outside the vessel 21a. An insulating member 21d is fitted around the vessel 21a, so that the temperature of steam stored within the steam storage portion 21b is maintained. A steam storage means 21 comprises these vessel 21a, insulating member 21d, and associated parts.

In the vicinity of the steam storage means 21, a gastight enclosure 22a almost in the shape of a hollow cylinder is placed. An insulating member 22d is fitted around the enclosure 22a, while an almost pipe-like inner piping 22e is arranged in the form of a coil within the enclosure 22a. A feed water pipe 22b is connected to a prescribed place in the lower portion of the enclosure 22a, while a heating medium transport pipe 22c is connected to a prescribed place in the upper portion thereof. A heat exchanger 22 as a heat-using means comprises these enclosure 22a, feed water pipe 22b, heating medium transport pipe 22c, inner piping 22e, and associated parts. Here, in FIG. 1, the case of the inner piping 22e in the shape of a pipe is described, but in another embodiment, it may be plate-shaped, though it is not shown.

One end of a steam piping 23 is connected to the upper portion of the inner piping 22e, while the other end thereof is connected through a valve 23a and a joint 23b to the upper portion of the steam storage means 21. On the other hand, one end of a discharge pipe 24 is connected to the lower portion of the inner piping 22e, while the other end thereof is open to the outside through a discharge means 25 comprising a trap 25a for removing condensate and a suction pump 25b. The solar thermal system according to the first embodiment comprises these solar thermal collector 10, steam storage means 21, heat exchanger 22, steam piping 23, discharge means 25, and associated parts.

In the use of the solar thermal system having the above construction, the solar thermal collector 10 is located in a place where solar light irradiates, and the valve 23a of the steam piping 23 is closed. As water is supplied to the droplet supply means 14 through the feed water piping 14a, a power supply switch (not shown) is turned on to drive the droplet supply means 14. Then, by ultrasonic vibration action, mist-like droplets 31 are generated and diffused within the steam generating chamber 13. In this case, the radius of the droplet 31 is desirably $10^{-4}$–$10^{-5}$ m or so. By radiative transfer from the absorbing body 12, or heat conduction in the contact with the absorbing body 12, the temperature of the droplet 31 rapidly rises to the saturation temperature with a saturation pressure of almost 1 atmospheric pressure, and the surface thereof begins to evaporate. When a power supply switch (not shown) of the mixing means 15 is turned on to drive the mixing means 15 to stir up the droplets 31, a large number of droplets 31 turn into steam. The difference between the pressure of steam within the steam generating chamber 13 and 1 atmospheric pressure is desirably a few hundred Pa or less so as to just cover the pressure loss of the transport system 18. Because of the pressure difference, steam as a heating medium passes through the transport system 18 and flows into the steam storage means 21. The steam with a small specific gravity is accumulated in the upper steam storage portion 21b, while an air region 33 with a large specific gravity is gradually pushed downward and is discharged from the opening 21c.

After a prescribed amount of steam 32 is accumulated in the steam storage means 21, water 34 as a heating medium is supplied into the enclosure 22a through the feed water pipe 22b. The valve 23a is opened to drive the discharge means 25. Then, the steam 32 is sucked by the suction pump 25b, passes through the steam piping 23 and the inner piping 22e, and loses its latent heat by heat exchange with the water 34 only to condense into water. Thus, the pressure in the heat exchanger 22 is lowered with the condensation of steam, so that the pressure therein is always lower than that in the steam storage portion 21b side. Therefore, only by driving the suction pump 25b at the start of the operation, steam is automatically and steadily supplied into the inner piping 22e from the steam storage portion 21b side, based on the pressure difference between the steam storage portion 21b and the inner piping 22e, resulting in little power required for driving the suction pump 25b. The condensate is separated at the trap 25a to be supplied to the droplet supply means 14, while the remaining gas is released to the atmosphere side by the suction pump 25b as needed. On the other hand, the heated water 34 becomes extremely hot water and is supplied through the heating medium transport pipe 22c to a feed water heater, a bathtub, a heating apparatus (none of them shown), and the like.

Figure 6:
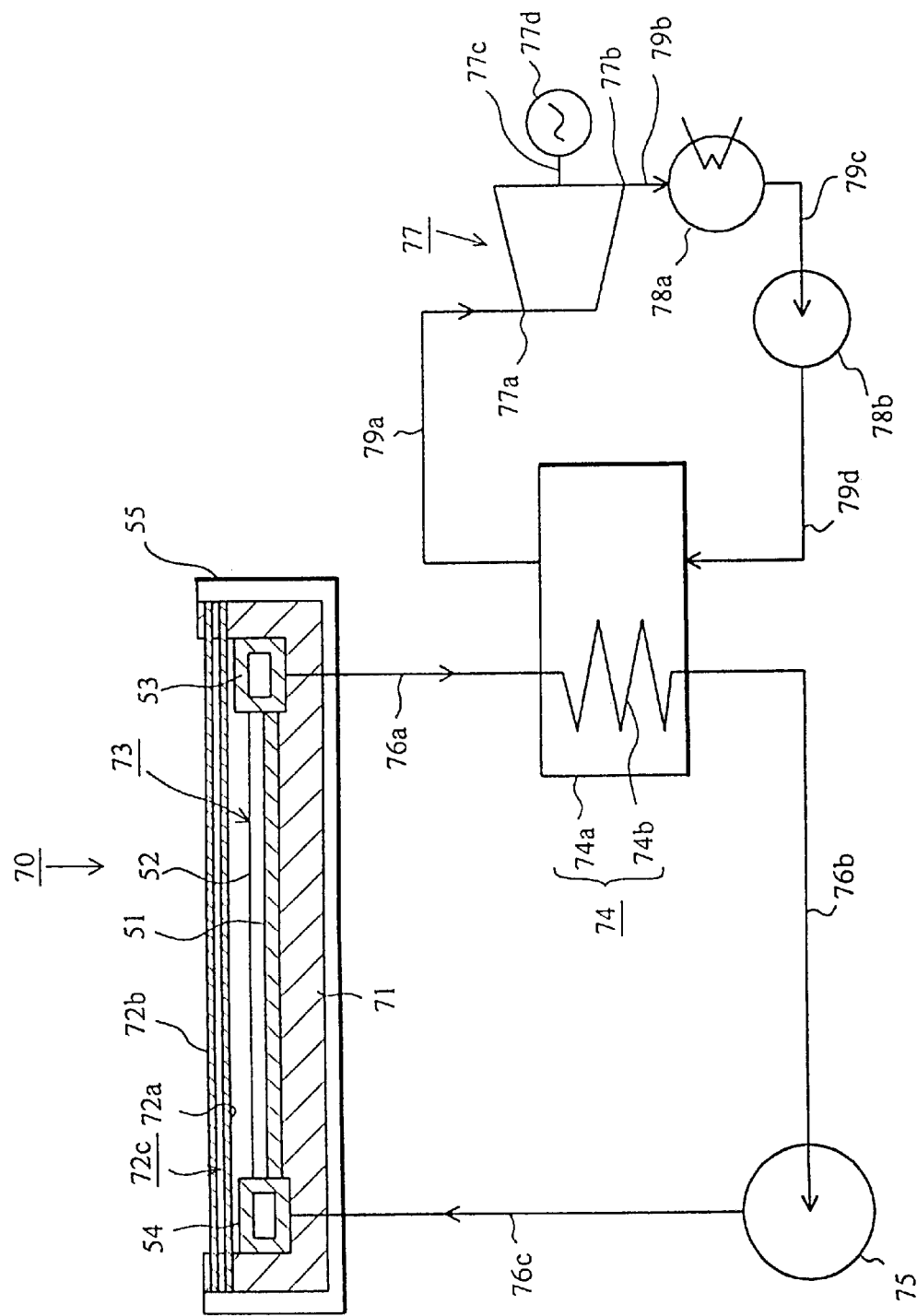
FIG. 6 is a sectional view schematically showing another conventional solar thermal system.

When a steam turbine, a generator, and a condenser (none of them shown) almost similar to those shown in FIG. 6 are connected to the steam piping 23, electricity is generated by steam sent from the steam storage portion 21b, so that a large amount of electric power can be taken out.

As is obvious from the above description, in the solar thermal system according to the first embodiment, the steam generating chamber 13 can be filled with the droplets 31 supplied by the droplet supply means 14, and since the droplet 31 remarkably easily absorbs radiant heat energy emitted from the absorbing body 12, compared with running water and the like, a large amount of droplets 31 can be easily vaporized. Therefore, solar thermal energy can be efficiently collected as steam latent heat having a large heat capacity, and the amount of water used to an amount of collected heat can be greatly reduced. Therefore, the light weight of the apparatus and the downsizing of the transport system devices can be achieved, and the capacities of the transport system devices can be reduced, resulting in a cost reduction. Moreover, since the constructions of the medium supply system such as the feed water piping 14a, and the heat transport system such as the steam piping 18 become simple, a large-scale system for acquiring a large amount of energy can be easily dealt with, and the system can be easily produced and maintained.

With the selective absorption film 12b formed on the top side of the metal plate 12a, solar thermal energy can be efficiently absorbed by the absorbing body 12, while with the black body film 12c formed on the bottom side of the metal plate 12a, the solar thermal energy absorbed by the absorbing body 12 can be efficiently transferred by radiation to the droplets 31. As a result, solar thermal energy can be efficiently collected. In addition, the transport resistance of the transport system 18 is set so that the steam pressure within the steam generating chamber 13 can be kept almost 1 atmospheric pressure. Therefore, as steam is generated in the steam generating chamber 13, almost the same amount of steam as that can be automatically pushed out and transported in sequence through the transport system 18 by making one end of the transport system 18 open to the atmosphere. Moreover, since the shape of the cross section of the transport system 18 can be easily determined based on the steam transport capacity, the transport distance, and the like so that the steam pressure within the steam generating chamber 13 can be kept almost 1 atmospheric pressure, the transport system 18 can be easily designed, and the resistance to pressure can be wholly held down. As a result, the cost can be substantially reduced.

The steam storage means 21 having the opening 21c with a prescribed shape is connected through the transport system 18 to the steam generating chamber 13. Therefore, as steam is continuously generated in the steam generating chamber 13, almost the same amount of steam as that can be automatically pushed out in sequence through the transport system 18 and be transported to the steam storage means 21. Since the specific gravity of the steam 32 is smaller than that of the atmosphere 33, and the atmosphere region 33 is always pushed up through the opening 21c with 1 atmospheric pressure, the transported steam 32 having about 1 atmospheric pressure can be certainly stored within the steam storage means 21. Since the heat exchanger 22 is connected through the steam piping 23 to the steam storage means 21, and the discharge means 25 to discharge the steam introduced to the heat exchanger 22 is mounted, the atmosphere dwelling in the heat exchanger 22 at the start of the operation, or an incondensable gas generated in the heat exchanger 22 during operation can be discharged. As a result, the steam 32 in the steam storage means 21 can be certainly transported and introduced to the heat exchanger 22 to be thermally utilized.

The droplets 31 and steam distributed and dwelling in a state where the temperature thereof becomes gradually higher in an upward direction within the steam generating chamber 13 can be wholly stirred up and mixed by the mixing means 15. As a result, the heat transfer efficiency from the absorbing body 12 to the droplets 31 can be heightened, so that steam can be efficiently generated.

By setting the distances $D_1$ and $D_2$ between the transmission body 17a and the absorbing body 12, and between the transmission bodies 17a and 17b, respectively, to be short, the heat loss outward based on the occurrence of convection can be held down, and the selective absorption film 12b formed on the top of the absorbing body 12 can be protected mechanically and chemically.

Here, in the solar thermal system according to the first embodiment, the case where the droplet supply means 14 and the mixing means 15 are separately placed is described, but in another embodiment not shown, the mixing means 15 shown in FIGS. 1 and 2 may not be placed, and a mixing means such as a fan may be incorporated into the droplet supply means 14 such as an ultrasonic atomizer.

In this case, since the mixing means and the droplet supply means are placed in the same position, the droplets 31 can be stirred up at the same time as the generation thereof. As a result, the heat transfer efficiency from the absorbing body 12 to the droplets 31 (both in FIGS. 1 and 2) can be further higher.

In the solar thermal system according to the first embodiment, the case where the transparent FEP films are used as the two transmission bodies 17a and 17b is described, but in another embodiment, one transmission body, or no transmission body may be used, and the material thereof may be reinforced glass or the like.

In the solar thermal system according to the first embodiment, the case where one solar thermal collector 10 is connected to the steam piping 18 is described, but in another embodiment, multiple solar thermal collectors 10 may be connected to the steam piping 18.

In the solar thermal system according to the first embodiment, the case where the opening 21c of the steam storage means 21 has almost the same diameter as that of the steam storage portion 21b is described, but in another embodiment, the opening may be made smaller than the steam storage portion 21b.

In the solar thermal system according to the first embodiment, the case where using the heat exchanger 22 as a heat-using means, the hot water (or steam) 34 obtained by heat exchange is supplied to a feed water heater, a bathtub, a heating apparatus, and the like is described, but in another embodiment, a heat pump, an absorption refrigerating machine, and the like may be adopted as a heat-using means, or a steam turbine and the like may be adopted as a power-using means.

In the solar thermal system according to the first embodiment, the case where the suction pump 25b is used for the discharge means 25 is described, but in another embodiment, a blower, an exhauster, or the like may be used.

In the solar thermal system according to the first embodiment, the case where the black body film 12c is formed by applying a silicone resin is described, but the black body film is not limited to that For example, a black coating may be applied.

In the solar thermal system according to the first embodiment, the case where the transport system 18 comprising the piping main 18a, flanges 18c and 18d, insulating member 18e, and associated parts is used is described, but in another embodiment, boards made by bonding a porous insulating plate (foamed plastic, ALC, or the like) to a sheet (stainless steel sheet, plastic sheet, or the like) may be assembled in the shape of a hollow rectangular parallelepiped and be bonded using an adhesive such as silicone rubber to form the transport system 18.

Figure 3:
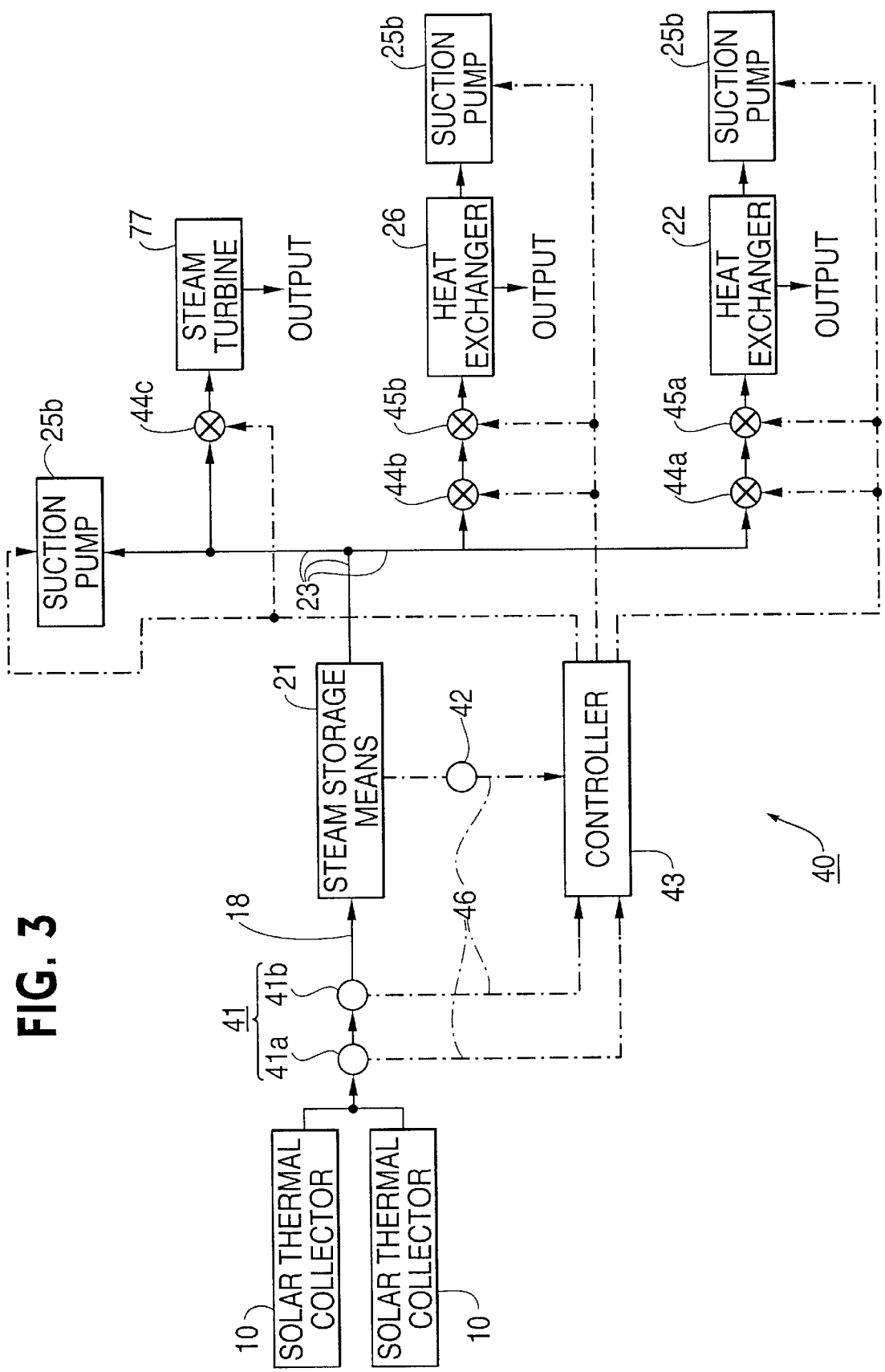
FIG. 3 is a block diagram schematically showing a solar thermal system according to a second embodiment.

FIG. 3 is a block diagram schematically showing a solar thermal system according to a second embodiment, and in the figure, reference numerals 10, 18, 21, 22 and 26, 23, and 25b represent a solar thermal collector, a transport system, a steam storage means, heat exchangers, a steam piping, and suction pumps, respectively, almost the same as those shown in FIG. 1. Multiple solar thermal collectors 10 are connected through the transport system 18 to the steam storage means 21, and a steam-generating speed detecting means 41 comprising a steam flowmeter 41a, a thermometer 41b, and associated parts is placed at a prescribed place in the transport system 18. Based on the steam-generating speed detected by the detecting means 41 and the sectional form of the transport system 18, the amount of steam generated in a unit of time is computed in a controller 43.

A steam storage detecting means 42, which comprises, for example, multiple moisture sensors (not shown) vertically aligned, is placed within the steam storage means 21. By detecting positions having a relatively high humidity, the amount of storage of steam can be obtained in the controller 43.

The steam storage means 21 is connected through the steam piping 23, automatic opening valves 44a and 44b, and automatic outside-air intake valves 45a and 45b to, for example, the heat exchangers 22 and 26 as heat-using means, respectively. The suction pump 25b as a discharge means is connected to each of the heat exchangers 22 and 26. When the automatic opening valves 44a and 44b are operated, a prescribed amount of steam flows or stops, while when the automatic outside-air intake valves 45a and 45b are opened/closed, the steam piping 23 is open to/cutoff from the outside air (not shown).

Moreover, the steam storage means 21 is connected through the steam piping 23, an automatic opening valve 44c to, for example, a steam turbine 77 as a power-using means. The suction pump 25b as a discharge means is connected to the steam piping 23 in the vicinity of the automatic opening valve 44c, and by driving the suction pump 25b at the start of driving, a gas such as the air dwelling within the steam piping 23 can be excluded.

The steam-generating speed detecting means 41, the steam storage detecting means 42, and an output detecting means (not shown) are electrically connected through signal lines 46 to the controller 43, while the controller 43 is electrically connected through the signal lines 46 to the suction pumps 25b, the automatic opening valves 44a–44c, and the automatic outside-air intake valves 45a and 45b. An outside-air intake regulator 40 comprises these steam-generating speed detecting means 41, steam storage detecting means 42, controller 43, valves 44a–44c, 45a and 45b, and associated parts. Since the construction except for the above is almost the same as that shown in FIG. 1, it is not described in detail here. The solar thermal system according to the second embodiment comprises these solar thermal collectors 10, steam storage means 21, heat exchangers 22 and 26 as heat-using means, turbine 77 as a power-using means, suction pumps 25b, outside-air intake regulator 40, and associated parts.

Figure 4:
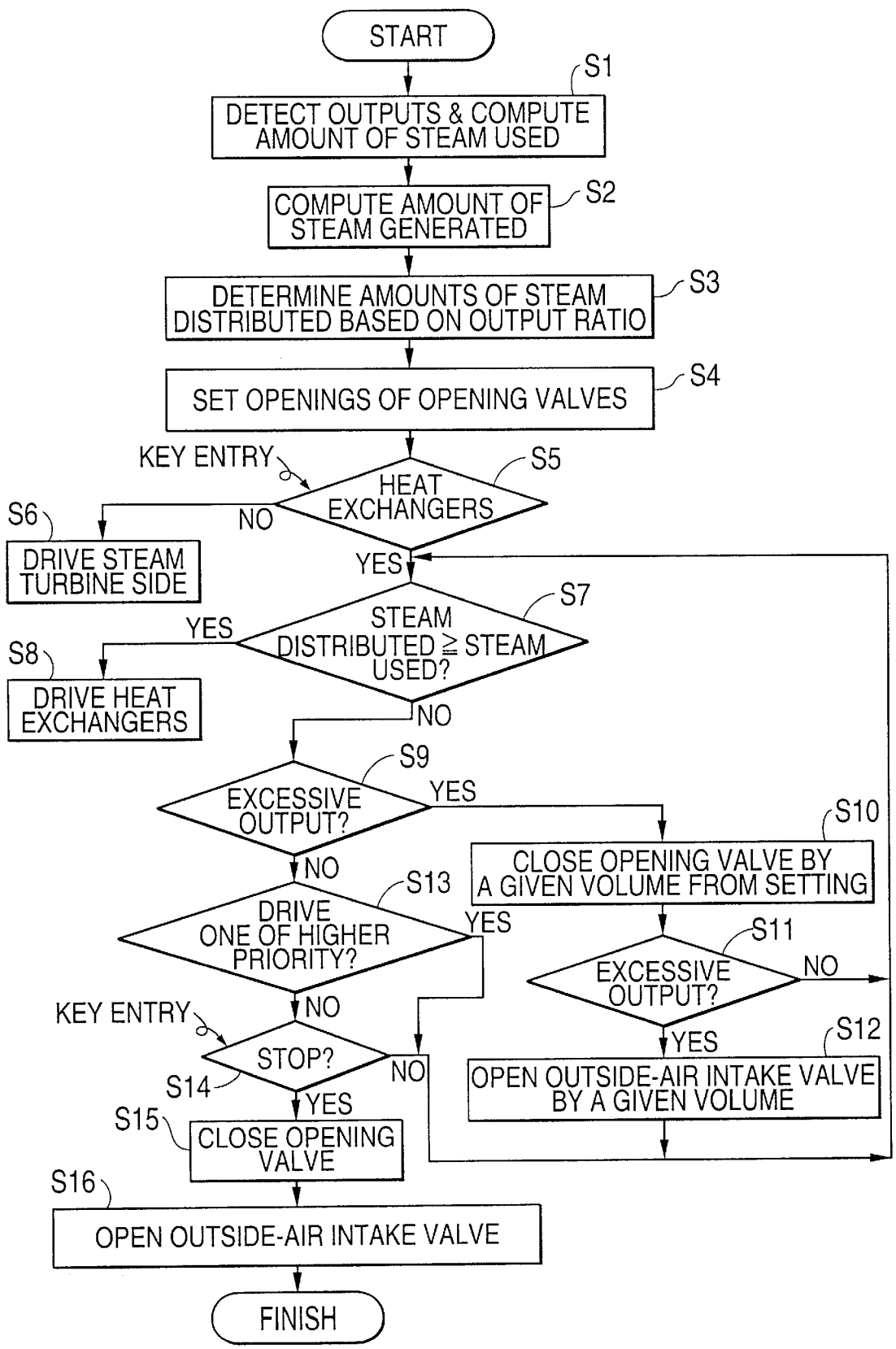
FIG. 4 is a flow chart schematically showing the operation of a controller in the solar thermal system according to the second embodiment.
Figure 5:
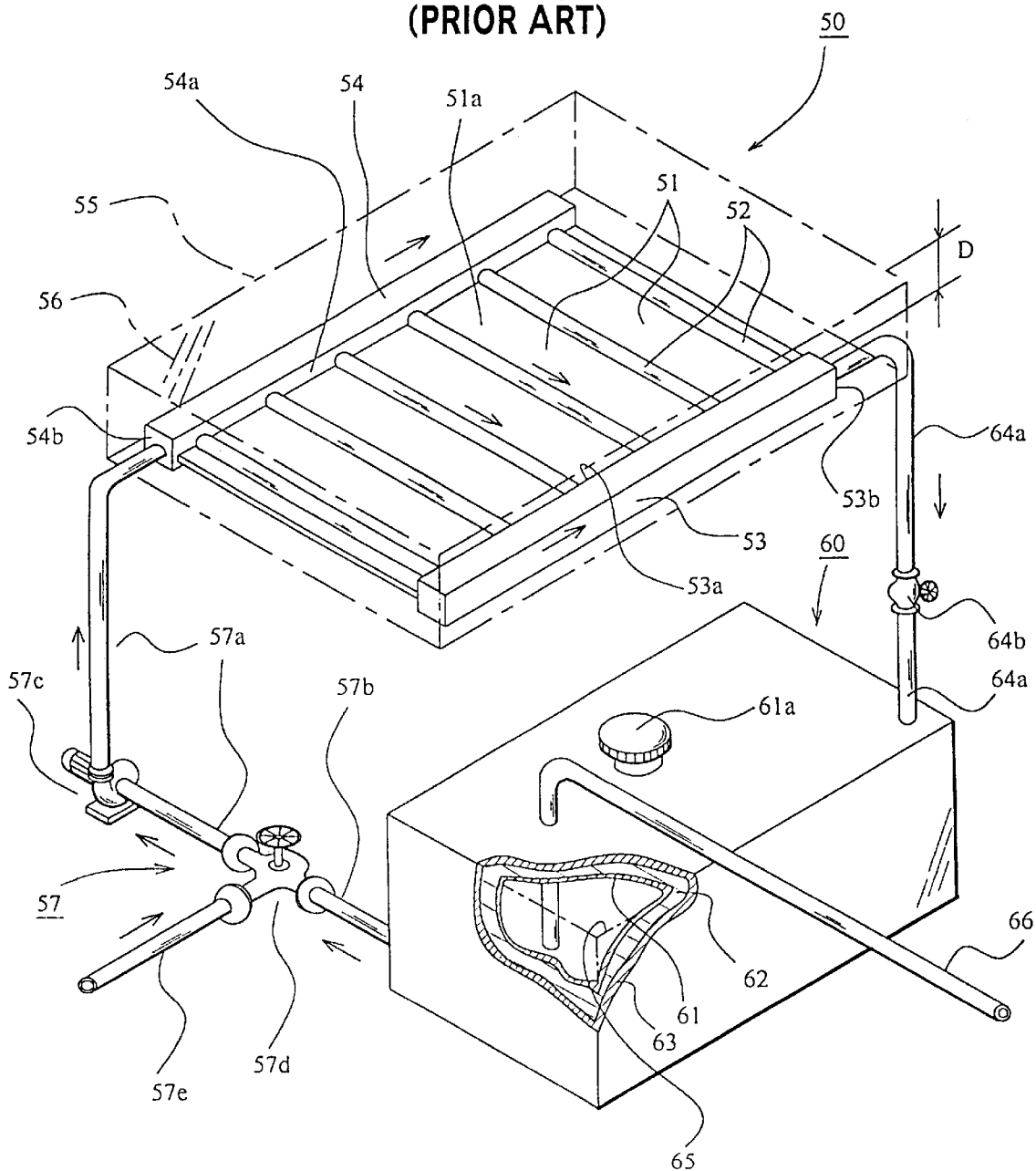
FIG. 5 is a perspective view partly in section schematically showing the principal part of a conventional solar thermal system.

The operation of the solar thermal system having the above construction is described here. FIG. 4 is a flow chart schematically showing the operation of the controller mainly to heat-using means in the solar thermal system according to the second embodiment. When the operation of the controller 43 is started by key entry, the outputs of the heat exchangers 22 and 26, and the steam turbine 77 are detected so as to compute the amount of steam used equivalent to the outputs (Step (S) 1). At the same time, based on the steam-generating speed detected by the detecting means 41 and the amount of storage of steam detected by the steam storage detecting means 42, the amount of steam generated is computed (S2). Then, based on the output ratio, the amounts of steam distributed to each of the heat exchangers 22 and 26, and the steam turbine 77 are determined (S3), and the openings of the automatic opening valves 44a–44c are set based on the amounts of steam distributed, respectively (S4). In S5, whether the objects to control are the heat exchangers 22 and 26 as heat-using means or not is judged, and when it is judged that no key entry is made, the drive of the steam turbine 77 is controlled. On the other hand, when it is judged with a key entry that the objects to control are the heat exchangers 22 and 26, whether the amount of steam distributed to the heat exchangers 22 and 26 is larger than the amount of steam used or not is judged in S7. When it is judged that the amount of steam distributed is larger, the drive of the heat exchangers 22 and 26 is started and proceeded (S8).

On the other hand, when it is judged that the amount of steam distributed is insufficient, whether each of the outputs of the heat exchangers 22 and 26 exceeds the reference capability or not is judged in S9. For example, when the output of the heat exchanger 22 is judged to be excessive, the opening of the automatic opening valve 44a set in S4 is reduced by a prescribed degree from the setting, so as to reduce the amount of steam distributed to the heat exchanger 22 (S10). Furthermore, in S1, whether the output of the heat exchanger 22 is still excessive or not is judged. When the output thereof is not judged to be excessive, the operation returns to S7. On the other hand, when the output thereof is judged to be still excessive, the automatic outside-air intake valve 45a is opened for a prescribed period of time so as to introduce a prescribed amount of air into the heat exchanger 22, resulting in slowing down the output, and then, the operation returns to S7.

On the other hand, when it is judged in S9 that neither of the outputs of the heat exchangers 22 and 26 is excessive (the amount of steam distributed to the heat-using means is absolutely on the insufficient side), in S13, to which of the heat exchangers 22 and 26 priority should be given is judged, based on the predetermined priorities of driving. For example, when it is judged that driving of the heat exchanger 22 is given priority, the operation returns to S7. And in S14, whether the key entry for stopping driving of the heat exchanger 26 is made or not is judged. When it is judged that the key entry is not made, the operation returns to S7. On the other hand, when it is judged that the key entry is made, the automatic opening valve 44b is closed (S15), the automatic outside-air intake valve 45b is opened and the suction pump 25b is operated to introduce outside air (S16), and driving of the heat exchanger 26 is stopped.

Although the detailed flow chart of the steam turbine 77 side is not shown here, the steam turbine 77 can be controlled by adjusting the opening of the automatic opening valve 44c and the time, depending on the amount of steam generated through the controller 43.

As is obvious from the above description, since the solar thermal system according to the second embodiment has the outside-air intake regulator 40, it is possible to control driving of the heat exchanger 22 as a heat-using means and certainly stop driving of the heat exchanger 26 by regulating the amount of steam supplied through the automatic opening valve 44a, or by introducing a prescribed amount of outside air through the automatic outside-air intake valve 45a.

Depending on variations in the amounts of steam generated and stored, it is possible to certainly distribute and supply prescribed flow rates of steam to the prescribed heat exchangers 22 and 26, and steam turbine 77 to drive.

Here, in the solar thermal system according to the second embodiment, the case where the automatic outside-air intake valves 45a and 45b for introducing outside air are arranged on the supply side of steam in the heat exchangers 22 and 26 is described, but in another embodiment, the automatic outside-air intake valves 45a and 45b may be arranged on the discharge side of steam therein.

In the solar thermal system according to the second embodiment, the case where the valves 44a–44c, 45a and 45b, and the suction pumps 25b are automatically operated using the controller 43 is described, but in another embodiment, they may be operated manually.

In the solar thermal system according to the second embodiment, the case where the heat exchangers 22 and 26, and the steam turbine 77 are used is described, but it is not limited to that. Although it is not shown, in another embodiment, multiple arbitrary heat-using means, multiple power-using means such as steam turbines, or the combination of multiple heat-using means and multiple power-using means may be used.

In the solar thermal system according to the second embodiment, the case where the detecting means 41 and 42 and the output detecting means are used for detecting the amounts of steam generated and used is described, but it is not limited to that. For example, the detecting means of the amount of solar radiation may be used in place of the steam-generating speed detecting means 41.

In the solar thermal system according to any of the first and second embodiments, the case where only solar heat is utilized is described, but in another embodiment, another heating means may be auxiliarily inserted in the transport system 18, so as to further superheat the steam with almost 1 atmospheric pressure generated in the steam generating chamber 13.

A low-pressure boiler may be placed in the vicinity of the steam storage means 21 and be connected through another transport system to the steam storage means 21 (both in FIG. 1), so as to auxiliarily supply saturated steam or superheated steam with almost 1 atmospheric pressure generated in the low-pressure boiler to the steam storage means 21.

INDUSTRIAL APPLICABILITY

The solar thermal energy can be efficiently collected at a low cost and be utilized for a feed water heater, a hot water pool, air conditioning, power generating, and the like.

What is claimed is:
1. A solar thermal system, comprising:
a solar thermal collector which comprises,
an absorbing body, made of a metal plate having a first surface on which a selective absorption film with a large absorptance of solar light and a small emissivity of infrared rays is formed, and a second surface on which is disposed a black body film, a heat insulation case fitted to the second surface of the absorbing body, a steam generating chamber formed between the hat insulation case and the absorbing body, a droplet supply unit to supply droplets into the steam generating chamber, a transport system whereby steam generated in the steam generating chamber is transported outside the system, wherein the transport resistance of the transport system is set so that the steam pressure within the steam generating chamber can be kept at almost 1 atmospheric pressure;

a steam storage unit, being connected through the transport system of the solar thermal collector, with an opening open to the atmosphere in the lower portion and a steam storage portion in the upper portion;

a heat-using device or a power-using device, being connected through a steam piping to the steam storage unit; and a discharge device to discharge a gas introduced to the heat-using device and the steam piping.

2. A solar thermal system according to claim 1, wherein a mixer to mix steam is mounted in the steam generating chamber.

3. A solar thermal system according to claim 1, wherein the droplet supply unit also serves as a mixing means.

4. A solar thermal system according to claim 1, further comprising a transmission body which transmits light arranged above the absorbing body so as to cover the absorbing body.

5. A solar thermal system according to claim 1, wherein the heat-using device is a heat exchanger and the power-using device is a steam turbine.

6. A solar thermal system, comprising:

a solar thermal collector which comprises, an absorbing body, made of a metal plate having a first surface on which a selective absorption film with a large absorptance of solar light and a small emissivity of infrared rays is formed, and a second surface on which is disposed a black body film, a heat insulation case fitted to the second surface of the absorbing body, a steam generating chamber formed between the heat insulation case and the absorbing body, a droplet supply unit to supply droplets into the steam generating chamber, a transport system whereby steam generated in the steam generating chamber is transported outside the system, wherein the transport resistance of the transport system is set so that the steam pressure within the steam generating chamber can be kept at almost 1 atmospheric pressure;

a steam storage unit, being connected through the transport system of the solar thermal collector, with an opening open to the atmosphere in the lower portion and a steam storage portion in the upper portion;

a heat-using device or a power-using device, being connected through a steam piping to the steam storage unit;

a discharge device to discharge a gas introduced to the heat-using device and the steam piping; and an outside-air intake regulator.

7. A solar thermal system according to claim 6, wherein the outside-air intake regulator is controlled using a controller, based on data from a detector to detect the amount of steam generated and the amount of steam stored in the steam storage unit.

8. A solar thermal system according to claim 6, wherein a mixer to mix steam is mounted in the steam generating chamber.

9. A solar thermal system according to claim 2, wherein the droplet supply unit also serves as a mixing means.

10. A solar thermal system according to claim 6, further comprising a transmission body which transmits light arranged above the absorbing body so as to cover the absorbing body.

11. A solar thermal system according to claim 6, wherein the heat-using device is a heat exchanger and the power-using device is a steam turbine.

* * * * *